Jan. 17, 1967 C. E. BECKER ET AL 3,298,323
HOPPER OUTLET CLOSURE STRUCTURE
Filed March 24, 1964 3 Sheets-Sheet 1

INVENTORS
CARL E. BECKER
WILLARD E. KEMP
BY [signature]
AGENT

Jan. 17, 1967 C. E. BECKER ET AL 3,298,323

HOPPER OUTLET CLOSURE STRUCTURE

Filed March 24, 1964 3 Sheets-Sheet 2

HOPPER OUTLET CLOSURE STRUCTURE 3,298,323

HOPPER OUTLET CLOSURE STRUCTURE

Carl E. Becker, St. Louis, and Willard E. Kemp, Bridgeton, Mo., assignors to ACF Industries Incorporated, New York, N.Y., a corporation of New Jersey Filed Mar. 24, 1964, Ser. No. 354,350
9 Claims. (Cl. 105—280)

This invention relates to hopper structures and more particularly to a hopper structure in which a movable gate regulates the discharge of material from the bottom discharge opening.

In the transporting and unloading of finely-divided materials, and particularly food stuffs, such as flour, sugar, and the like, it is necessary that no foreign matter or accumulation of moisture be permitted to contact and possibly contaminate the material from the underside of the gate. Normally, a circumferential housing or frame extends downwardly about the discharge outlet beneath the gate so that a suitable chute or the like may fit about the discharge outlet to receive the material when the gate is opened and the material is unloaded. If the interior of the housing beneath the gate is not covered or protected in some manner when the gate is closed, moisture or foreign matter, such as dust, clay, smoke, and the like, may be deposited on the interior surface of the housing or the lower surface of the gate. Thus, upon subsequent unloading the deposited foreign matter will, at least to a certain extent, be entrained in the material being unloaded.

Heretofore, flexible plastic covers have been proposed to fit around the housing to keep out foreign matter from the area between the gate and the lower surface of the housing. Such covers are relatively difficult to seal tightly about the housing and must be individually removed from the housing before the unloading. Then, after the unloading is completed, the cover must again be secured about the housing. Another manner of closing the bottom of the housing beneath the sliding gate has been the utilization of a plate bolted to the underside of the housing. This arrangement necessitates the removal of the plate before unloading of the material and the subsequent attachment of the plate after unloading which is, of course, time consuming.

The present invention is directed to a hopper structure having a bottom discharge outlet and a movable gate regulating the flow of material through the outlet in which the underside of the movable gate and the adjacent support structure beneath the gate is protected against the entry of foreign matter and the like into the area beneath the movable gate. A movable gate, such as a sliding gate, normally has a lower frame supporting the gate for back and forth movement between open and closed positions. This frame usually extends outwardly from the hopper discharge outlet in order to support the gate in its open position. The present invention provides a bottom cover for this frame which moves between open and closed positions in a generally horizontal plane beneath the frame with the space utilized for the frame also utilized by the bottom cover. This permits the bottom protective cover to be employed beneath the supporting frame with a minimum of additional space.

It is an object of the present invention to provide a novel hopper structure having a movable gate controlling the flow of material through a bottom outlet in which the area of the hopper structure beneath the movable gate is protected from foreign matter and the like, thereby to prevent contamination of the material being unloaded from the hopper structure.

An additional object of this invention is the provision of a novel protective cover beneath the supporting frame for a movable gate which cover utilizes generally the same area utilized by the supporting frame in moving between open and closed positions relative to the bottom discharge outlet.

A further object of this invention is the provision of such a protective cover beneath the supporting frame for a movable gate which is easily moved between open and closed positions beneath the supporting frame.

The invention accordingly comprises the constructions hereinafter described, the scope of the invention being indicated in the following claims.

In the accompanying drawings in which one of various possible embodiments of the invention is illustrated:

Corresponding reference characters indicate corresponding parts throughout the several views of the drawings.

Figure 1:
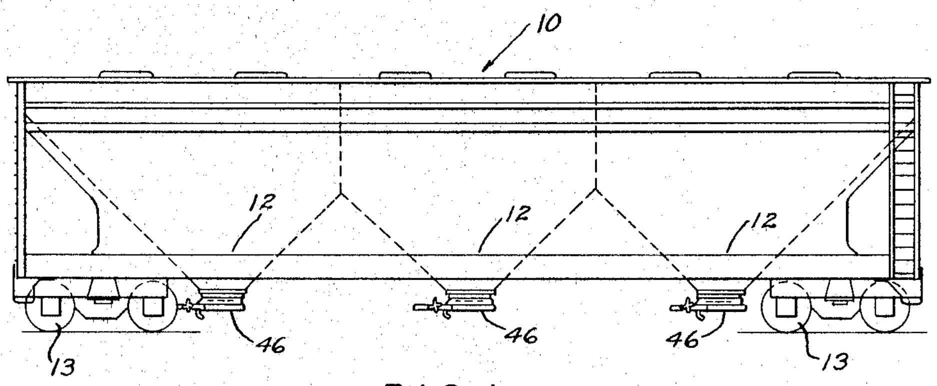
FIGURE 1 is a side elevation of the present invention illustrated in use on a covered hopper railway car.

Referring to the drawings for a better understanding of the invention and more particularly in FIGURE 1, a covered railway hopper car is designated generally 10 and has a plurality of hopper structures 12. A wheel assembly 13 is arranged adjacent each end of railway car 10.

Each hopper structure 12 includes respective pairs of oppositely facing hopper side sheets 14 and 15 reinforced by angles 16. Sheets 14 and 15 funnel downwardly to a box type structure formed of vertically disposed plates 17 defining a generally rectangular open box-shaped bottom outlet 18. Covered hopper railway car 10 is illustrated as being of the gravity un-loading type. However, it is to be understood that the present invention may be employed with hopper cars which are unloaded pneumatically.

Figures 5, 6, 7, 8:
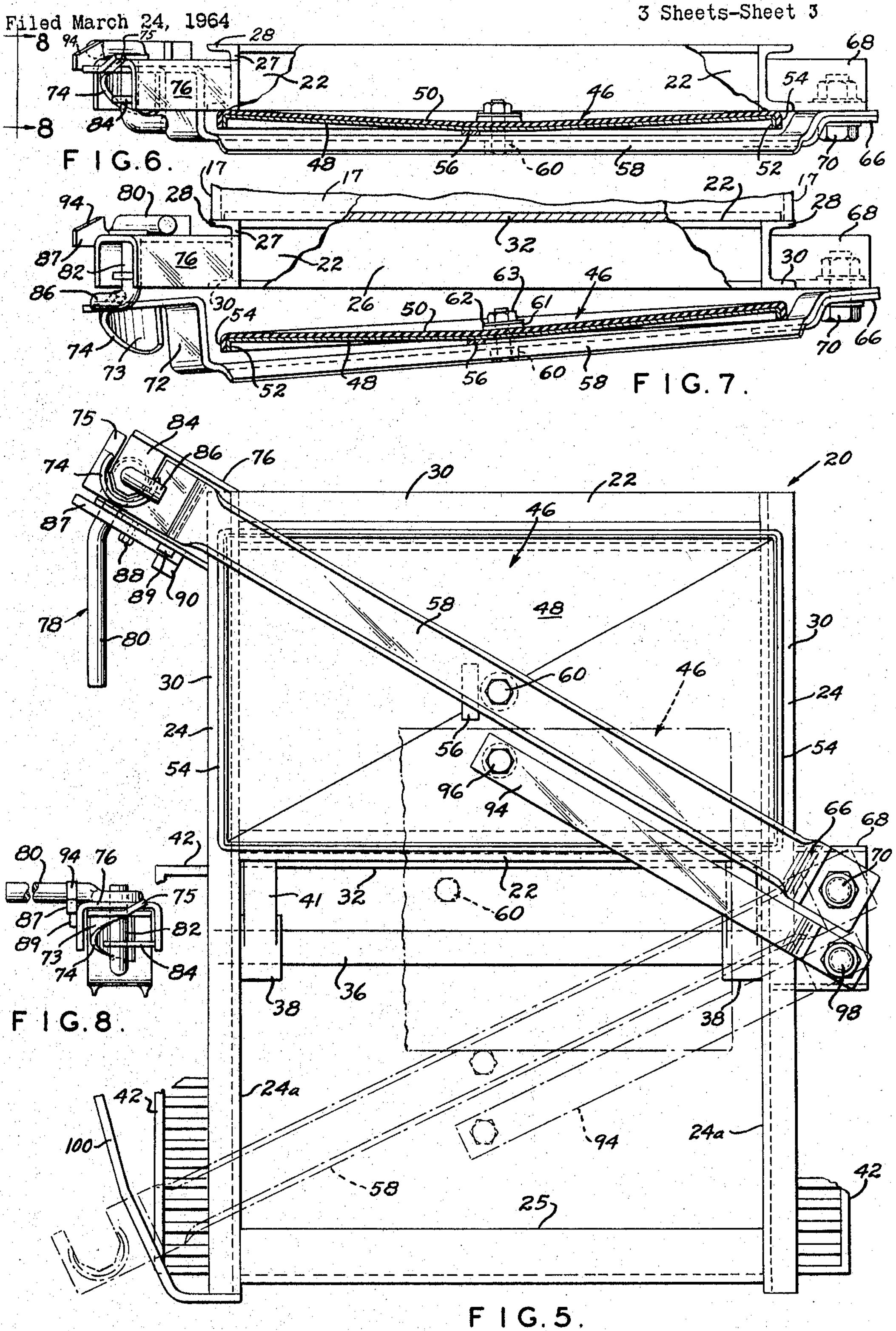
FIGURE 5 is a bottom plan of the lower portion of the hopper structure with the bottom cover illustrated in closed position, the broken lines indicating the open position of the bottom cover.
FIGURE 6 is an elevational view of the lower portion of the hopper structure with certain parts in section illustrating the bottom cover releasably locked in closed position against the lower surface of the hopper structure.
FIGURE 7 is an elevational view similar to FIGURE 6 illustrating the bottom cover unlocked and lowered to a position beneath the movable gate from which it is moved to an open position removed from beneath the movable gate.
FIGURE 8 is an end elevation looking generally along line 8—8 of FIGURE 6 and showing means to raise and lower the protective cover.

Extending around bottom outlet 18 and secured to hopper side sheets 14 and 15 is a generally rectangular frame generally designated 20. Frame 20 forms a skirt about outlet 18 and comprises a pair of generally parallel outwardly opening channel members 22 connecting a pair of generally parallel channel members 24. Extensions 24A of channel members 24 project outwardly from hopper structure 12 in cantilevered fashion and are connected adjacent to their outer ends by cross-member 25 as shown in FIGURE 5. Each channel member 22 and 24 has a web 26 and respective upper and lower legs 28 and 30.

Figure 4:
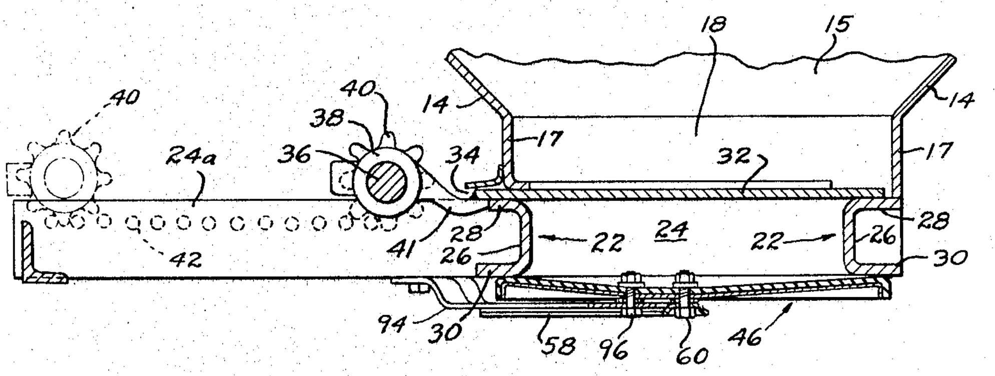
FIGURE 4 is a vertical section of the lower portion of the hopper structure shown in FIGURE 2 and 3.
Figures 2, 3:
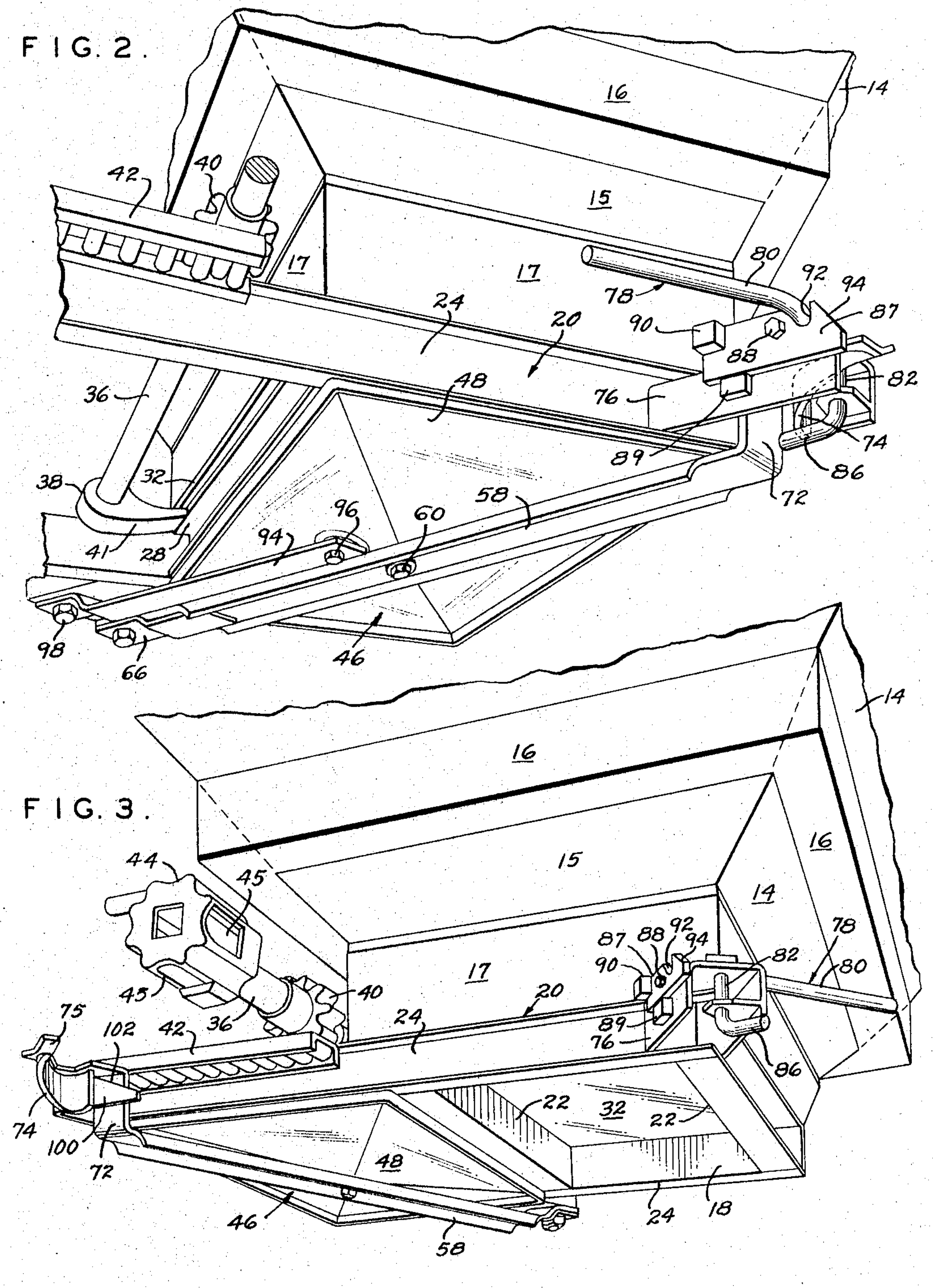
FIGURE 2 is a perspective of the bottom cover comprising the present invention in closed position beneath a movable gate of one of the hopper structures illustrated in FIGURE 1.
FIGURE 3 is a perspective of the present invention simliar to FIGURE 2 but showing the bottom cover in an open position.

Mounted for sliding back and forth movement on supporting frame 20 is a gate 32 (FIGURES 3 and 4). Frame 20 forms a support for gate 32 and gate 32 slides outwardly on extensions 24A. A portion of one plate 17 adjacent to and in the path of movement of gate 32, is formed to define a slot 34 receiving gate 32 as shown in FIGURE 4. To slide gate 32 back and forth for opening and closing discharge outlet 18, a shaft 36 is mounted on a bearing 38 secured to each side of the upper surface of gate 32. An extension 41 between each bearing 38 and gate 32 connects shaft 36 with gate 32 for planar movement. A pinion 40 adjacent each end of shaft 36 engages an associated rack 42 secured to the adjacent extension 24A. Projecting from one end of shaft 32 is a drum-like windlass 44 having a plurality of slots 45 adapted to receive a rod or handspike for rotating shaft 36 and opening and closing gate 32.

Mounted beneath frame 20 and constituting the present invention is a structure for protecting the area enclosed by frame 20 beneath the closed position of gate 32 from foreign matter and the like. A protective cover or sheild generally designated 46 and of a rectangular shape is adapted to fit against the lower surface of frame 20 to seal the enclosed portion of outlet 18 beneath closed position of gate 32. Cover 46 includes a metal base plate 48 and an upper resilient layer or sheet 50, each having respective downturned edges 52 and 54 (FIGURES 6 and 7). The length and width of the protective cover 46 are slightly larger than the enclosed space formed by frame 20 and gate 32.

Figure 9:
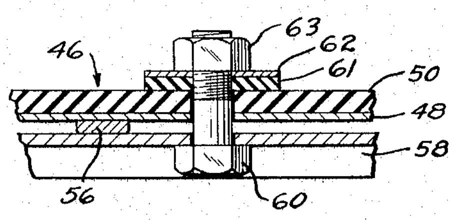
FIGURE 9 is an enlarged fragment of FIGURE 6 illustrating the fulcrum arrangement of the bottom cover.

Metal base plate 48 is of a generally pyramidal shape with its undersurface sloping upwardly slightly from a central portion on which a lug 56 is secured. Supporting and carrying protective cover 46 is an arm or strap generally designated 58. A bolt 60 extends through arm 58 and cover 46 closely adjacent lug 56 as shown in FIGURE 9. A resilient washer 61 is positioned around bolt 60 in contact with upper resilient layer 50 and a metal washer 62 is positioned between washer 61 and a nut 63. Bolt 60 and nut 63 are so arranged as to exert leverage against the upper surface of cover 46 with lug 56 acting as a fulcrum. Resilient washer 61 in contact with layer 50 continuously urges cover 46 to the position shown in FIGURE 7. Cover 46 fits loosely about bolt 60 to permit a slight tilting about lug 56 which remains in contact with arm 58 during movement of cover 46 between open and closed positions.

An end portion 66 of arm 58 is curved upwardly and outwardly beneath a generally channel-shaped support bracket 68 fixed to frame 20. Arm 58 extends diagonally across the underside of protective cover 46 to bracket 68. A bolt and nut combination 70 pivotally connects arm 58 to bracket 68. Arm 58 is loosely mounted for limited vertical movement on bolt and nut combination 70 relative to bracket 68. Extending from the other opposite end of arm 58 is an upwardly and outwardly extending end portion 72. Extending downwardly from end portion 72 is a lug 73 forming a downwardly facing cam surface 74 as illustrated in FIGURE 8. Adjacent cam surface 74 is an upturned finger 75 of end portion 72 which forms a continuation of cam surface 74.

A cannel-shaped support 76 is secured to a corner of frame 20. A handle generally designated 78 includes a handle portion 80 extending outwardly from support 76 and adapted to be gripped manually by an operator for releasing and securing protective cover 46. Extending downwardly from handle portion 80 is a shank 82 projecting through the support 76 and an ear 84 secured to the inner surface of support 76. A horizontally projecting lower end portion 86 of handle 78 is adapted to engage and ride along cam surface 74 for raising and lowering arm 58 and portective cover 46.

To hold arm 58 and protective cover 46 in a releasably locked position, a latch 87 is pivoted at 88 to the support 76 and a weight 90 fixed to latch 87 adjacent its inner end thereof urges latch 87 in a counterclockwise rotation to the position shown in FIGURES 2 and 3. A lug 89 limits the pivoting of latch 87 in the counterclockwise direction. A notch 92 is formed at the outer end of latch 87 and is adapted to receive handle 78 as shown in FIGURE 2.

Upon manual rotation of handle 78 from the position shown in FIGURE 7, lower projection 86 engages finger 75 and arcuate cam surface 74 to pull arm 58 and protective cover 46 upwardly to the position shown in FIGURES 2 and 6. Cam surface 94 on latch 87 is first engaged by handle portion 80 to pivot latch 87 downwardly and allow handle portion 80 to ride into notch 92. The weight 90 returns latch 87 to a position locking handle 78 within notch 92. To release handle 78, latch 87 is manually pivoted about pivot 88 permitting handle 78 to be rotated away from notch 92.

It is desirable that cover 46 move between open and closed positions generally beneath the area defined by frame 20 so as to require only a minimum clearance, which is particularly important with hopper structures having relatively large discharge outlets. To accomplish this, a link 94 is pivoted at 96 to cover 46 and at 98 to bracket 68. A parallelogram linkage is formed by arm 58, link 94 and pivots 60, 70, 96 and 98 to effect movement of cover 46 to the position of FIGURE 3 with the longitudinal and transverse axes of cover 46 remaining oriented with respect to the axes of the hopper structure during the entire travel of cover 46 between open and closed positions. Thus, the angular relationship between the axes of cover 46 and the axes of the hopper structure remain fixed during travel of cover 46. Cover 46 moves a maximum distance away from frame 20 when the longitudinal axes of arm 58 and cover 46 are in parallel relation as shown in broken lines in FIGURE 5.

During movement of cover 46 upon the swinging of arm 58, relative movement occurs about bolt 60 between arm 58 and cover 48. It is desirable that a minimal frictional contact occur between downturned edges 52, 54 of cover 46 and the upper surface of arm 58 adjacent bolt and nut combination 70 during such relative movement. Lug 56 and bolt 60 are so arranged that cover 46 is urged about the fulcrum formed by lug 56 to a position at which the downturned edges 52, 54 adjacent bolt and nut combination 70 engage arm 58. The hardness of resilient washer 61 determines to a certain extent the force with which edges 52, 54 engage arm 58 in the open position of cover 46. Thus, resilient washer 61 is of a hardness to provide a minimal frictional contact between arm 58 and cover 46 upon the swinging movement of arm 58.

Immediately upon rotation of handle 78 to release cover 46 from its closed position, resilient washer 61 urges cover 46 to the position of FIGURE 7 in a tilting action. Cover 46 is held in this position with the edge of cover 46 adjacent bolt and nut combination 70 spaced from frame 20 when arm 58 is swung to open position.

Upon rotation of handle 78 to raise cover 46 from its position shown in FIGURE 7 to its position of FIGURE 6, the edge of cover 46 adjacent end portion 72 first engages frame 20 and tilts cover 46 about fulcrum 56 to draw the edge of cover 46 adjacent end portion 66 of arm 58 into engagement with frame 20. A substantially airtight seal is obtained between cover 46 and frame 20 with resilient layer 50 pressing tightly against the undersurface of frame 20.

Projecting from channel-shaped member 24 adjacent cross member 25 is a retaining bar 100, see FIGURES 3 and 5. Arm 58 rides along an inclined upper cam surface 102 of bar 100 upon swinging of protective cover 46 to the position of FIGURE 3 and is supported on bar 100 in the open position of protective cover 46.

Operation is as follows:

When it is desired to unload finely-divided material from hopper structure 12 and beginning with protective cover 46 and gate 32 in closed position as shown in FIGURE 2, latch 87 is manually pivoted to disengage notch 92 from handle 78. Then, handle 78 is rotated to lower cover 46 and arm 58 to the position of FIGURE 7 with cam surface 74 disengaging handle 78 and cover 46 tilting about fulcrum 56 to its FIGURE 7 position under the bias of resilient washer 61. Arm 58 and cover 46 are then swung to the position of FIGURE 3, the longitudinal axis of cover 46 remaining in a fixed angular position relative to frame 20 during the entire movement of cover 46 between open and closed positions. A suitable chute or the like may be placed beneath frame 20 about the outlet opening to receive the finely-divided material from a car 10 upon subsequent opening of gate 32 by rotation of shaft 36. Handle 78 may be connected, if desired, to a railroad seal so that the seal is broken upon rotation of handle 78 away from notch 92. Protective cover 46 may be closed in reverse procedure.

The term "generally rectangular" as employed in the specification and claims herein is to be interpreted as including non-circular shapes, such as oblong or generally elliptical shapes. For examples, discharge outlet 18 may be formed with rounded or arcuate corners and cover 46 may have a similar shape.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. In combination, a hopper structure having a bottom discharge opening and a gate movable between open and closed positions relative to the discharge opening for regulating discharge of lading from the hopper structure, a generally rectangular skirt extending downwardly about said bottom discharge opening beneath the movable gate when in closed position, a generally rectangular bottom cover adapted to fit against the lower surface of said skirt and to form an enclosed space with the skirt and gate when the gate is in closed position, an arm carrying said cover for swinging movement in a generally horizontal plane beneath said skirt between a closed position adjacent the skirt to prevent the entrance of foreign matter into the enclosed area and an open position removed from the skirt to permit the discharge of lading, said arm having one end pivotally mounted adjacent one of the corners of said rectangular skirt and extending generally horizontally across the cover to a position adjacent an opposite corner of said skirt, and means adjacent said opposite corner of said skirt to releasably secure the opposite end of said arm to the skirt in the closed position of the cover, the opposite end of said arm adapted to be gripped manually for movement of the cover between open and closed positions.

2. A hopper structure having a bottom discharge opening and a gate movable between open and closed positions relative to the discharge opening for controlling discharge of lading from the hopper structure, a skirt extending downwardly about said bottom discharge opening beneath the movable gate when in closed position, a generally rectangular bottom cover beneath the skirt to form an enclosed space with the skirt and gate when the gate is in a closed position in engagement with the lower surface of said skirt, and an arm beneath the cover pivotally carrying the cover about a vertical axis for moving the cover in a generally horizontal plane between open and closed positions, said arm extending generally horizontally across the cover and being pivotally mounted adjacent one end to the hopper structure for swinging movement in a generally horizontal plane, and means adjacent the opposite end of said arm to releasably secure the arm to the skirt in the closed position of the cover, said cover fitting loosely about said vertical axis and having a fulcrum spaced from said vertical axis between the arm and the cover, the cover tilting in one direction about said fulcrum upon engaging the lower surface of the skirt when moved into closed position and tilting in an opposite direction about said fulcrum upon disengaging the lower surface of the skirt when being moved to the open position.

3. A hopper structure as set forth in claim 2 wherein said means to releasably secure the arm in the closed position of the cover comprises a cam structure to raise and lower the arm and cover when the cover is beneath the skirt permitting the cover to engage and disengage, respectively, the lower surface of the skirt.

4. A hopper structure as set forth in claim 2 wherein said cover is continuously urged downwardly in a resilient manner about said vertical axis on the arm to exert a leverage about said fulcrum for effecting the tilting of the cover upon engagement and disengagement with the lower surface of said skirt.

5. A hopper structure as set forth in claim 4 wherein means hold the axes of the cover oriented with respect to the axes of the skirt during the entire movement of the cover between open and closed positions.

6. A hopper structure having a bottom discharge opening and a generally rectangular gate slidable between open and closed positions relative to the discharge opening for controlling discharge of lading from the hopper structure, a generally rectangular frame beneath the bottom discharge outlet supporting the door for sliding movement and having an extension outwardly of the discharge outlet for supporting the door in its open position, a generally rectangular bottom cover adapted to fit against the lower surface of said frame and to form an enclosed area with the frame and gate when the gate is in closed position, an arm beneath the cover pivotally carrying the cover about a generally vertical axis and moving the cover in a generally horizontal plane between open and closed positions, said arm extending generally horizontally across the cover and being pivotally mounted adjacent one end to the hopper structure for swinging movement about a vertical axis in a generally horizontal plane, and means on the frame adjacent the other end of said arm when the cover is beneath the discharge outlet to raise and lower the arm and cover thereby permitting the cover to move to open position upon lowering of the arm without contacting the lower surface of the frame.

7. A hopper structure as set forth in claim 6 wherein means are provided to hold the cover oriented with the longitudinal axis of the cover remaining in a fixed direction upon its entire movement between open and closed positions.

8. A hopper structure as set forth in claim 7 wherein said means to hold the cover oriented comprises a parallelogram linkage operatively connected to said cover.

9. A hopper structure as set forth in claim 6 wherein means mount said cover loosely about said generally vertical axis on said arm for relative pivotal movement in a generally horizontal plane, and a fulcrum for said cover is spaced from said vertical axis and positioned between the arm and cover to permit tilting of the cover in one direction upon engagement of the cover with the lower surface of the frame and in an opposite direction about said fulcrum upon disengaging the lower surface of the frame when being lowered.

(References on following page)

References Cited by the Examiner

UNITED STATES PATENTS

| | | | |
|---|---|---|---|
| 1,342,091 | 6/1920 | Campbell | 105—239 |
| 2,556,354 | 6/1951 | Williamson | 105—377 X |
| 2,751,861 | 6/1956 | Withall | 105—282 |
| 2,751,862 | 6/1956 | Dorey | 105—282 |
| 2,914,000 | 1/1959 | Mulcahy | 105—280 |
| 3,155,052 | 11/1964 | Carney | 105—377 |
| 3,228,353 | 1/1966 | Carney | 105—377 |

References Cited by the Applicant

UNITED STATES PATENTS

| | | | |
|---|---|---|---|
| 2,855,864 | 10/1958 | Dath | 105—308 |
| 2,926,963 | 3/1960 | Dorey | 302—52 |
| 2,962,325 | 11/1960 | Dorey | 302—52 |

ARTHUR L. LA POINT, *Primary Examiner.*

H. BELTRAN, *Assistant Examiner.*